United States Patent [19]

Sep et al.

[11] 4,347,170

[45] Aug. 31, 1982

[54] UNSATURATED POLYESTER COMPOSITIONS AND THEIR USE

[75] Inventors: Waltherus J. Sep, Doorn; Adam Huijsman, Hasselt, both of Netherlands

[73] Assignee: Internationale Octrooi Maatschappij "Octropa" B.V., Rotterdam, Netherlands

[21] Appl. No.: 194,500

[22] Filed: Oct. 6, 1980

[30] Foreign Application Priority Data

Oct. 12, 1979 [GB] United Kingdom ................. 7935602

[51] Int. Cl.³ .................. C08L 91/06; C08K 5/03; C08K 5/05
[52] U.S. Cl. ................................. 523/511; 523/518
[58] Field of Search ................. 260/28.5 R, 28.5 A, 260/28 R; 325/1, 11

[56] References Cited

U.S. PATENT DOCUMENTS

| 3,014,001 | 12/1961 | Murray ............... 260/28.5 R |
| 3,042,651 | 7/1962 | Martens ............... 525/39 |
| 3,382,031 | 5/1968 | Cox ............... 106/14.42 |
| 3,382,032 | 5/1968 | Cox ............... 260/31.2 R |
| 3,449,468 | 6/1969 | Vrotney et al. ............... 260/28.5 R |
| 3,657,387 | 4/1972 | Stahly et al. ............... 525/11 |
| 3,726,817 | 4/1973 | Niswonger ............... 260/28.5 R |
| 3,923,927 | 12/1975 | Miyake et al. ............... 525/19 |
| 4,218,546 | 8/1980 | Downing et al. ............... 525/170 |
| 4,221,905 | 9/1980 | Tokas ............... 525/1 |

FOREIGN PATENT DOCUMENTS

| 584467 | 10/1959 | Canada ............... 525/11 |
| 617637 | 4/1961 | Canada ............... 260/28.5 R |
| 8216 | 2/1980 | European Pat. Off. . |
| 1156230 | 10/1963 | Fed. Rep. of Germany ...... 523/511 |
| 1669064 | 5/1973 | Fed. Rep. of Germany ...... 523/504 |
| 713332 | 8/1954 | United Kingdom ............... 523/518 |
| 1188112 | 4/1970 | United Kingdom . |

OTHER PUBLICATIONS

Derwent Abst. 27611W/17, "Unsat. Polyester Moulding . . ." (DS1669687) 4-17-75, BASF.
Derwent Abst. 00733B/01, "Low Volatility Resin Moulding Compsn . . ." (J53132087) 11-17-78, Nippon Shokubai.

*Primary Examiner*—Paul Lieberman
*Assistant Examiner*—H. J. Lilling
*Attorney, Agent, or Firm*—Barry Kramer

[57] ABSTRACT

The invention provides novel curable unsaturated polyester compositions comprising an unsaturated polyester, a reactive copolymerizable monomer, a paraffin wax as an evaporation-reducing agent and as an adhesion promotor a compound, containing 10–30 carbon atoms, of the class consisting of alkylaromatic, alkenylaromatic, alkylolaromatic compounds or an alcohol.

7 Claims, No Drawings

UNSATURATED POLYESTER COMPOSITIONS AND THEIR USE

The invention relates to unsaturated polyester compositions, in particular to such polyester compositions which contain a copolymerisable volatile reactive monomeric material. These polyester compositions are used in the production of copolymers, by means of a catalyst, usually a peroxide, and an accelerator yielding a polymerized polyester resin. Once the polymerisation reaction has been completed, a polymerized polyester results. Sometimes also up to 30% (w/w) of thermoplastic polymer is present. The resin frequently also contains fillers, thixotropic agents and reinforcement material like fibrous material, in particular glass fibre.

Fibre-reinforced laminated polyester resin constructions are usually built up by techniques involving initiating and catalyzing the polyester composition, impregnating the fibrous material and hardening. Hand layup, spray-up, pressing and other wet-moulding techniques are usually employed. More layers are usually subsequently superimposed, optionally with hardening in between.

The unsaturated, polymerizable, polyesters which are normally used for the above techniques are based primarily on dicarboxylic acids and diols. The dicarboxylic acid component normally comprises an ethylenically unsaturated acid like maleic or fumaric acid and an aromatic acid such as a phthalic acid. Optionally a saturated aliphatic or hydro-aromatic acid such as succinic acid, adipic acid or tetrahydrophthalic acid is incorporated. The diol component normally comprises a $C_2$-$C_6$ diol such as e.g. ethylene glycol, propylene glycol or diethylene glycol. Unsaturated alcohols may also be present, e.g. in the form of allyl esters. Polycarboxylic acids and polyols are sometimes incorporated to some extent but their polyfunctional properties are usually compensated for by some monofunctional material. Instead of the free carboxylic acids also their functional derivatives such as anhydrides or lower alkyl esters can be used. Also dicyclodienyl units and/or cyclopentadienyl units are sometimes incorporated.

The volatile reactive monomeric material comprises at least one ethylenically unsaturated compound (e.g. a vinyl group) which is copolymerisable with the unsaturated polyester by means of an initiator and an and an accelerator, and this monomer also acts as a solvent for the unsaturated polyester and improves the workability by modifying the properties, in particular the viscosity. Examples of suitable volatile monomeric materials are styrene, vinyl toluene and α-methyl styrene, of which styrene is preferred.

The commercially available unsaturated polyesters preferably contain 30-45%, but in general 30-60% by weight of volatile reactive monomer.

A peroxide initiator is normally employed to copolymerize the polyestermonomer composition, which polymerization is normally effected at ambient or elevated temperatures. Peroxides, in particular organic peroxides, like ketone peroxides, dioxydialkyl peroxides, diacyl peroxides etc., are used and the particular initiator actually selected for a specific purpose depends on the desired rate of polymerization. Quantities of up to a few percent of the initiator, based on the weight of the resin, are usually sufficient. Curing accelerators such as certain metal salts and/or certain amines are usually also included in the composition to be polymerized.

A drawback of the unsaturated polyester composition used at present is that during and after the application, but before completion of the polymerization a considerable amount of the volatile reactive monomeric material evaporatores, leading to objectionable losses in the polyester composition and to air pollution on the site where polyester resin objects are manufactured.

Several attempts have been made to reduce or overcome this drawback. The suggestion has been made to replace volatile reactive monomeric material by less volatile material, but no suitable monomeric material for wet application techniques was available. Attempts to reduce evaporation by covering the wet laminate with e.g. Cellophane (regenerated cellulose) film have been made but found to be too cumbersome.

It has also been suggested to add a small amount of certain organic compounds such as higher amides to the polyester composition, which impede evaporation of the volatile reactive monomer, but this has not appeared satisfactory. The incorporation of certain paraffins and mixtures thereof in polyester compositions has also been proposed, in European Pat. Appln. No. 78100727, inter alia to improve polymerization on the surface so as to avoid tacky surfaces, due to the "air-inhibition effect". The incorporation of certain waxes has also been suggested for the same purpose, e.g. in German Pat. Specn. No. 1,956,376. This results in products with paraffin or wax on the surface, resulting in a very poor adhesion of subsequent layers, unles cumbersome sanding was carried out between superimposing. There has been a need of simple additives decreasing evaporation without affecting the mechanical properties of laminates, in particular adhesion between the layers.

It has now been found that improved unsaturated polyester compositions with decreased evaporation of volatile monomeric material and excellent adhesion between superimposed layers can be obtained by the incorporation of small amounts of at least one higher molecular weight hydrocarbon together with a lower molecular weight organic compound of the class consisting of alkylaromatic compounds, alkenyl aromatic comounds, alkylol aromatic compounds and aliphatic alcohols, each in amounts of from 0.005 to 3%, preferably 0.01 to 1.0% by weight of the polyester composition.

The higher molecular weight hydrocarbons used according to the invention have an average molecular weight of at least 250 but below 700, preferably between 350 and 550, and a softening point above 30° C., preferably between 45° and 55° C. Such hydrocarbons usually contain mainly straight-chain paraffins, some branched-chain paraffins, aromatic groups and/or olefinic groups and/or naphthenic groups. Suitable hydrocarbons are commercially available as such or may be obtained by blending several commercial grades together.

The lower molecular weight organic compounds consisting of the class comprising aromatic hydrocarbons, such as alkyl benzenes, alkenyl benzenes and alkylol benzenes, and alcohols contain 10-30, preferably 15-20 carbon atoms. Suitable compounds are butyl benzene, nonyl benzene, n-dodecyl benzene, tetrapropylene benzene, hexadecylbenzene, octadecyl benzene and dihydronaphthalene,[+)] in which the substituent may be straight- or branched-chained or cyclo-aliphatic. The alkyl benzenes are preferred in practising the present invention, because their effect in preventing delamination is superior. Further, monoalcohols:n- octanol-1, 2-ethylhexanol-1, dodecanol-1, tetradecylol-1 and hexadecanol-1, benzyl alcohols and higher homologues thereof can be used. +)=i.e. substituted benzenes In view of the fact that higher alcohols are generally known to promote evaporation (cf. U.S. Pat. No. 3,382,031, col. 1, par. 1), it was quite surprising that combination of paraffins and higher alcohols in unsaturated polyesters resulted in both a reduced evaporation and an excellent adhesion.

If the weight ratio of higher molecular weight hydrocarbon to lower molecular weight compound as defined above is between 1:20 and 1:2, in particular 1:10 and 1:4, excellent results as regards suppressing evaporation and retaining adhesion between superimposed layers can be obtained without sanding of the previous layer before laying up the next layer.

It is therefore an embodiment of the invention to provide improved unsaturated polyester compositions showing a reduced tendency towards evaporation of the volatile reactive monomer and an excellent adhesion between the layers of the laminate, and to provide methods for the preparation of such improved polyester compositions.

In another embodiment of the invention moulded goods are manufactured by polymerizing a polyester composition as described above without appreciable losses of monomeric material and with a reduced air pollution by incorporating a peroxide initiator and accelerator and curing.

The invention thus provides an improved method for laminating polyester compositions in which less volatile reactive monomer escapes (reduction to about 10% of original evaporation figure), providing products in which the strength between the layers of the laminate is not impaired. The following experiments have been made and illustrate the invention in conjunction with the Examples.

EXPERIMENT 1

An unsaturated polyester resin prepared from 1 mole of maleic anhydride, 1 mole of phthalic anhydride and 2.1 moles of propylene glycol was dissolved in 40 wt.% of styrene, showed a viscosity of 0.3 Pa s at 20° C. and an acid value of 22 and was used in the absence of a peroxide initiator. 50 g of the composition was poured into a pan with a surface of 193.5 cm$^2$ and a side of 5 mm height and exposed to the atmosphere at 20° C. and the weight losses were recorded:
 after 0.5 h—50 g/sq.m.
 after 1 h—100 g/sq.m.
 after 1.5 h—150 g/sq.m.
 after 2 h—200 g/sq.m.

Another sample of the polyester composition was polymerized by incorporating 1% (w/w) of a cobalt octoate solution in xylene containing 1% of metal and 2% of a 50% solution of methylethyl ketone peroxide in dimethyl phthalate. In order to determine the adhesion between the layers 3 layers of glass mat (450 g glass fibre per sq.m. per layer) were impregnated with the polyester composition (glass percentage 30 (w/w), and polymerized for 4 days at room temperature, after which a same laminate was applied on top of it and polymerized for 24 h at room temperature, followed by an after-cure of 4 h at 80° C. and 2 h at 110° C.

Forced mechanical delamination testing according to British Standard (BS) 2782-p3 341A (1977) showed visually that a 100% adhesion of the surfaces had been obtained.

EXPERIMENTS 2, 3, 4 AND 5

The procedure of Experiment 1 was repeated, however with addition to the polyester composition of 0.025, 0.05, 0.10 and 0.15% (w/w) of refined, substantially straight-chain paraffin wax (mp 52°–54° C.), average molecular weight 500, respectively. Evaporation after impregnating a glass mat was determined by weight loss expressed in grams per square meter. Also the adhesion of the surfaces was determined. The results are tabulated below.

|   |   | 1 | 2 | 3 | 4 | 5 |
|---|---|---|---|---|---|---|
| Amount of paraffin added (in %) | | 0 | 0.025 | 0.05 | 0.10 | 0.15 |
| Evaporation g/sq.m. | 0.5 h | 50 | 40 | 25 | 7 | 4 |
|  | 1 h | 100 | 50 | 35 | 11 | 6 |
|  | 1.5 h | 150 | 70 | 40 | 16 | 6 |
|  | 2 h | 200 | 90 | 45 | 20 | 6 |
| Adhesion (BS 2782-p3 (341A) 1977 | | 100 | 100 | 100 | 50 | 10 |
| Modified(+) forced delamination test | | 100 | 80 | 50 | 10 | 0 |

(+)Modified as to composition and testing of a curved strip

EXAMPLE I

Experiment 1 was repeated using 0.15% (w/w) of semi-refined, mainly straight-chain paraffin (mp 48°–50° C., average molecular weight 400) and 1% of n-dodecyl benzene. Evaporation was as follows:
 after 0.5 h—4 g/sq.m
 after 1 h—6 g/sq.m
 after 1.5 h—7 g/sq.m
 after 2 h—8 g/sq.m.

Upon curing and after-curing the adhesion between the layers was determined as described above and showed an adhesion of 100%, according to both testing methods, of the surfaces. A similar result was obtained when n-hexadecyl benzene was used instead of n-dodecyl benzene.

EXAMPLE II

The procedure of Example I was repeated, using however:
 0.1% of semi-refined paraffin (mp 50°–52° C., average molecular weight 450),
 0.5% of 2-ethylhexanol.
 The styrene evaporation was:
 after 0.5 h—6 g/sq.m
 after 1 h—9 g/sq.m
 after 1.5 h—12 g/sq.m
 after 2 h—14 g/sq.m The adhesion was 100% according to BS 2782-341A p3 (1977), but on modified forced delamination it was 90%.

EXAMPLE III

The procedure of Example I was repeated, using:
 0.5% of nonanol and
 0.1% of a 1:1 mixture of refined/semi-refined paraffins (mp abt. 48° C., average molecular weight 400 (mixture)).
 The styrene evaporation was:
 after 0.5 h—7 g/sq.m
 after 1 h—10 g/sq.m
 after 1.5 h—13 g/sq.m after 2 h—15 g/sq.m.

The adhesion according to BS 2782-341A p3 (1977) was 100%, but on modified forced delamination it was 85%.

EXAMPLE IV

The procedure of Example I was repeated, using 0.05% tetraline and 0.10% of a semi-refined paraffin (mp 40°–42° C., average molecular weight 300).

Evaporation was as follows:
after 0.5 h—7 g/sq.m
after 1 h—11 g/sq.m
after 1.5 h—16 g/sq.m
after 2 h—20 g/sq.m.

The adhesion according to BS 2782-341A p3 (1977) was 100%, but on modified forced delamination it was 90%.

We claim:

1. An unsaturated curable polyester composition comprising:
   (a) an unsaturated polyester which is derived from an ethylenically unsaturated dicarboxylic acid, a $C_2$–$C_6$ diol and optionally a saturated or hydroaromatic dicarboxylic acid;
   (b) a volatile reactive monomer selected from the group consisting of styrene, vinyl-toluene and α-methylstyrene in an amount of 30–60% by weight; and
   (c) from 0.005 to 3% by weight of a combination of adjuncts comprising
      (1) a paraffin wax having an average molecular weight of 250–700, and
      (2) An alkylaromatic or alkenylaromatic compound having from 10 to 30 carbon atoms, or a mono-alcohol selected from the group consisting of n-octanol-1, 2-ethyl-hexanol-1, dodecanol-1, tetradecylol-1 and hexadecanol-1,
   in which the weight ratio of (c1): (c2) is from 1:20 to 1:2.

2. A composition according to claim 1, in which (b) is present in an amount of from 30 to 45% by weight.

3. A composition according to claim 1 or 2, in which the weight ratio of (c1): (c2) is from 1:10 to 1:4.

4. A composition according to claim 1, in which (c2) is an aromatic compound.

5. A composition according to claim 4, in which (c2) is an alkylbenzene.

6. A composition according to claim 1, in which (c1) has an average molecular weight of from 350 to 550.

7. A composition according to claim 4, in which (c2) is an alkenyl-benzene.

* * * * *